United States Patent [19]

Ohmi et al.

[11] Patent Number: 4,567,728

[45] Date of Patent: Feb. 4, 1986

[54] MOUNTING STRUCTURE FOR CLUTCH BOOSTER ASSEMBLY

[75] Inventors: Atsushi Ohmi, Anjo; Masami Sugihara, Inazawa; Satoru Maruyamano, Toyota; Isao Tsuzuki, Kariya, all of Japan

[73] Assignees: Aisin Seiki Kabushiki Kaisha, Kariya; Toyota Jidosha Kabushiki Kaisha, Toyota, both of Japan

[21] Appl. No.: 478,102

[22] Filed: Mar. 23, 1983

[30] Foreign Application Priority Data

Apr. 5, 1982 [JP] Japan .............................. 57-49133[U]

[51] Int. Cl.$^4$ ............................................. B60T 13/00
[52] U.S. Cl. .................................. 60/547.1; 92/168 B; 92/169.2
[58] Field of Search ............................. 60/533, 547.1; 92/169.2, 169.3, 169.4, 168 B

[56] References Cited

U.S. PATENT DOCUMENTS

| | | | |
|---|---|---|---|
| 3,120,296 | 2/1964 | Randol | 92/169.2 |
| 3,166,908 | 1/1965 | Chouings | 92/168 B |
| 4,246,755 | 1/1981 | Weiler | 92/169.2 |
| 4,269,533 | 5/1981 | Mashiki et al. | 403/410 |
| 4,353,287 | 10/1982 | Weiler | 92/169.4 |
| 4,377,069 | 3/1983 | Kobayashi | 92/169.2 |
| 4,418,613 | 12/1983 | Weiler | 92/169.3 |
| 4,433,614 | 2/1984 | Takeuchi | 92/169.3 |
| 4,446,699 | 5/1984 | Fujii | 92/169.4 |

FOREIGN PATENT DOCUMENTS

| | | | |
|---|---|---|---|
| 2109957 | 9/1972 | Fed. Rep. of Germany | 92/168 B |
| 120445 | 9/1981 | Japan | 92/169.2 |
| 2070171 | 9/1981 | United Kingdom | 92/169.2 |

Primary Examiner—Abraham Hershkovitz
Attorney, Agent, or Firm—Oblon, Fisher, Spivak, McClelland & Maier

[57] ABSTRACT

A mounting structure for a clutch booster assembly to be arranged adjacent to and in front of a vacuum brake booster assembly fixed to a forward fire-wall structure of a vehicle body. A bracket member of a U-shaped cross-section fixed to the fire-wall structure opens toward one side of the brake booster assembly and supports the clutch booster assembly on its front end. A flexible tubular cover member has a front end secured to the front end of the bracket member to hermetically enclose a rear air suction opening of the clutch booster assembly and a rear end coupled within an opening of the fire-wall structure, and a flexible tubular sealing boot has a front end secured to the rear end of the cover member and a rear end secured to an operation rod of the clutch booster assembly. The sealing boot is provided with an annular lip in engagement with the front face of the fire-wall structure and at its rear end with a vent hole.

3 Claims, 3 Drawing Figures

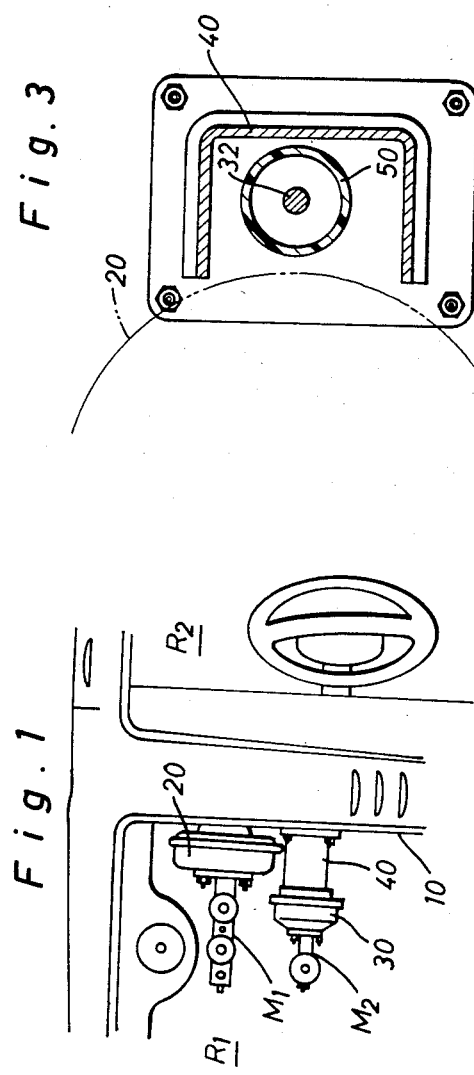

MOUNTING STRUCTURE FOR CLUTCH BOOSTER ASSEMBLY

BACKGROUND OF THE INVENTION

1. Field of the Invention

The present invention relates to a mounting structure for a clutch booster assembly to be arranged adjacent to and in front of a vacuum brake booster assembly fixed to the front face of a forward fire-wall structure of a vehicle body, the clutch booster assembly being mounted on a bracket member fixed to the fire-wall structure to be located in place.

2. Discussion of the Background

A conventional bracket member for such a clutch booster assembly as described above is, in general, in the form of a cylindrical member the interior of which is isolated from an engine room and communicates with the interior of the passenger compartment. In such arrangement, the cylindrical bracket member is provided to prevent entry of the outside air and water into the passenger compartment and to permit the flow of air sucked into the clutch booster assembly from the passenger compartment. In recent years, however, it is required to limit the mounting space for both the brake and clutch booster assemblies, while the brake booster assembly has become large in size. For these reasons, it is difficult to arrange both the booster assemblies in a limited space in the engine room without any interference.

SUMMARY OF THE INVENTION

It is, therefore, a primary object of the present invention to provide an improved mounting structure capable of mounting both the brake and clutch booster assemblies in a limited space in an engine room without any interference.

According to the present invention there is provided a mounting structure for a clutch booster assembly to be arranged adjacent in front of a vacuum brake booster assembly fixed to the front face of a forward fire-wall structure of a vehicle body, which comprises a bracket member of a U-shaped cross-section opening toward one side of the brake booster assembly, the bracket member being fixed at its rear end to the front face of the fire-wall structure and supporting the clutch booster assembly on its front end. The mounting structure further comprises a flexible tubular cover member contained within the bracket member and in surrounding relationship with an operation rod of the clutch booster assembly, the tubular cover member being secured in a fluid-tight manner at its front end to the rear end face of the clutch booster assembly to enclose a rear opening of the clutch booster assembly and being coupled at its rear end within an opening of the fire-wall structure, and a flexible tubular sealing boot secured in a fluid-tight manner at its front end to the rear end of the cover member and at its rear end to a portion of the operation rod extending into the passenger compartment. The sealing boot is further provided at the front end thereof with an annular lip resiliently in engagement with the front face of the fire-wall structure and provided at the rear end thereof with a vent hole communicating the interior of the cover member into the passenger compartment.

BRIEF DESCRIPTION OF THE DRAWINGS

Additional objects and advantages of the present invention will be more readily apparent from the following detailed description of a preferred embodiment thereof when taken together with the accompanying drawings in which:

FIG. 1 is a plan view partly illustrating an engine room and a passenger compartment of a vehicle body;

FIG. 2 is a partly broken sectional view illustrating a mounting structure of the clutch booster assembly shown in FIG. 1; and FIG. 3 is a cross-sectional view taken along line III—III in FIG. 2.

DESCRIPTION OF THE PREFERRED EMBODIMENT

Referring now to the drawings, FIG. 1 illustrates a forward fire-wall structure 10 which subdivides a vehicle body into an engine room $R_1$ and a passenger compartment $R_2$. Mounted on the front face of fire-wall structure 10 are a vacuum brake booster assembly 20 and a vacuum clutch booster assembly 30 in parallel. The vacuum brake booster assembly 20 is directly fixed at its rear end to the front face of fire-wall structure 10, and a brake master cylinder $M_1$ is assembled with the front end of booster assembly 20. As shown in FIGS. 1 and 2, the clutch booster assembly 30 is arranged adjacent in front of the brake booster assembly 20, which is fixed to the front face of fire-wall structure 10 by means of a bracket member 40. A clutch master cylinder $M_2$ is assembled with the front end of clutch booster assembly 30.

In such arrangement as described above, as can be well seen in FIG. 3, the bracket member 40 has a U-shaped cross-section opening toward the inside of the brake booster assembly 20, and the clutch booster assembly 30 is fixed to the front end of bracket member 40. As shown in FIGS. 2 and 3, a flexible tubular cover member 50 of elastic synthetic resin is contained within bracket member 40 coaxially with the clutch booster assembly 30 and in surrounding relationship with an operation rod 32 of booster assembly 30. The tubular cover member 50 is formed at its front end with an annular flange 51 which is securely interposed in a fluid-tight manner between the rear end face of booster assembly 30 and the front end face of bracket member 40 to enclose a rear air suction opening 31 of booster assembly 30 and the front portion of rod 32. The tubular cover member 50 is further formed at its rear end with a stepped cylindrical portion 52 which is coupled within an opening 11 of fire-wall structure 10.

A flexible tubular sealing boot 60 of elastic synthetic resin is coupled in a fluid-tight manner at its front end over the stepped cylindrical portion 52 of cover member 50 and is coupled in a fluid-tight manner at its rear end within an annular groove 32a formed at a portion of rod 32 extending into a passenger compartment $R_2$. The front end of boot 60 is integrally formed with an annular lip 61 which is supported by the stepped cylindrical portion 52 of cover member 50 to be hermetically in engagement with the front face of fire-wall structure 10 around opening 11. The rear end of boot 60 is formed with an axial vent hole 62 and provided therein with an air filter 70. Thus, the axial vent hole 62 communicates the interior of tubular cover member 50 with the interior of passenger compartment $R_2$ through air filter 70.

In the mounting structure of clutch booster assembly 30, as is illustrated by an imaginary line in FIG. 3, the brake booster assembly 20 can be arranged adjacent the bracket member 40 in a limited space without any interference. The tubular cover member 50 is associated with the sealing boot 60 to prevent entry of the outside air and water into the clutch booster assembly 30 and passenger compartment $R_2$ from the engine room $R_1$, and the axial vent hole 62 of boot 60 permits the flow of air sucked into the clutch booster assembly 30 from the passenger compartment $R_2$ through air filter 70. Additionally, the resiliency of annular lip 61 of boot 60 serves to ensure the sealing effect at the front face of fire-wall structure 10 without influence of an error in assembly of the bracket member 40, cover member 50 and the like.

Having thus described the preferred embodiment of the invention it should be understood that numerous structural modifications and adaptations may be resorted to without departing from the spirit of the invention.

What is claimed is:

1. A mounting structure for a clutch booster assembly arranged adjacent to and in front of a vacuum brake booster assembly fixed to the front face of a forward fire-wall structure of a vehicle body, the mounting structure comprising:
    a backet member of a U-shaped cross section arranged to contain therein one side portion of said brake booster assembly, said bracket member having a rear end fixed to the front face of said fire wall structure and a front end supporting thereon said clutch booster assembly;
    a flexible tubular cover member contained within said bracket member and arranged in surrounding relationship with an operation rod of said clutch booster assembly, said tubular cover member having a front end secured in a fluid-tight manner to the rear end face of said clutch booster assembly and a rear end coupled within an opening of said fire wall structure; and
    a flexible tubular sealing boot having a front end secured in a fluid-tight manner to the rear end of said cover member and a rear end coupled over a portion of said operation rod located in the passenger compartment of said vehicle body, said sealing boot being integrally formed at the front end thereof with an annular lip resiliently in engagement with the front face of said fire-wall structure to close said opening of said fire-wall structure and being formed at the rear end thereof with a vent hole communicating the interior of said cover member into the passenger compartment.

2. A mounting structure for a clutch booster assembly as claimed in claim 1, wherein said tubular cover member is formed at said rear end with a stepped cylindrical portion, and the front end of said tubular sealing boot is coupled over the stepped cylindrical portion of said cover member.

3. A mounting structure for a clutch booster assembly as claimed in claim 1, further comprising an air filter provided within said rear end of said tubular sealing boot, and said vent hole further comprises an axial vent hole facing said air filter.

* * * * *